Nov. 28, 1961  A. W. PEAR, JR  3,010,543
HIGH-SPEED DISC BRAKE
Filed Nov. 16, 1959  5 Sheets-Sheet 1

INVENTOR
ARTHUR W. PEAR, JR.
BY *Robb & Robb*
ATTORNEYS

Nov. 28, 1961

A. W. PEAR, JR

3,010,543

HIGH-SPEED DISC BRAKE

Filed Nov. 16, 1959

INVENTOR
ARTHUR W. PEAR, Jr

BY *Robb & Robb*

ATTORNEYS

United States Patent Office 3,010,543
Patented Nov. 28, 1961

3,010,543
HIGH-SPEED DISC BRAKE
Arthur W. Pear, Jr., Benton Harbor, Mich., assignor, by mesne assignments, to Lambert Brake Corporation, St. Joseph, Mich., a corporation of Michigan
Filed Nov. 16, 1959, Ser. No. 853,128
10 Claims. (Cl. 188—72)

The present invention relates to friction devices, and, more particularly, to improved multiple disc brakes especially adaptable for high speed usage such as encountered in aircraft and other vehicles or in high-speed industrial machinery.

More specifically, this invention further relates to fluid-pressure-operated multiple disc brakes utilizing improved axially disposed self-adjuster means which comprise one-way shiftable members.

One object of this invention is to provide an improved heavy duty air-cooled multiple disc brake which is particularly adaptable to high-speed aircraft braking, wherein a relatively large braking area is required to absorb the attendant high brake torque energy, thus necessitating the use of a plurality of heavy-duty braking surfaces, together with the utilization of a plurality of circumferentially spaced fluid-pressure-operated actuator means producing an axial operating thrust to achieve initial or primary actuation of the brake.

Another object of this invention is to provide a lightweight multiple disc brake of this type, with improved automatically operable one-way shiftable adjuster means disposed generally parallel to the central axis of the brake assembly for more positive and efficient automatic compensation for lining wear, and which is operable directly responsive to axial thrust, as distinguished from self-adjuster means mounted for response to rotative movement of the brake operating means, such as provided in certain prior constructions embodying self-energizing means. However, while a brake according to this foregoing objective is preferably provided with such axial thrust responsive adjuster means, my improved self-adjuster means is equally useful and adaptable to a brake which is provided with self-energizing means by simply arcuately enlarging the screw-end-engaging-surfaces in the brake assembly to assure uniform contact of the adjuster screw end therewith as it operates responsive to a combined rotative and axial thrust.

Still another object is to provide a self-adjusting multiple disc brake including a pair of axially spaced relatively fixed plates, an actuator disc assembly disposed adjacent to one of said plates, relatively rotatable friction discs disposed between the actuator disc assembly and the other of said plates, actuator means between the actuator disc assembly and first-mentioned plate for shifting the actuator disc assembly toward the other latter-mentioned plate to frictionally inter-engage the friction discs therebetween, automatic adjuster means including one-way shiftable screw adjusters, together with novel bow spring means to prevent retrograde shifting of said screw adjusters, for limiting movement of the actuator disc assembly in the other direction, when the brake is released, so as to maintain a predetermined spaced relation between the actuator disc assembly and the other plate at the opposite side of the friction discs in proportion to the combined thickness of the friction discs, regardless of the amount of wear of the friction discs.

A further object is to provide a heavy duty multiple disc brake according to the preceding objects, together with adjustable return spring means for returning the brake actuator disc means and operator means to their respective brake-released position when the friction device is in a non-operating condition.

Still a further object is to provide a lightweight but heavy duty combined wheel and brake assembly wherein the brake, by means of its rotors, is slidably mounted on the wheel, which, in turn, is secured to an axle of an appropriate support, such as an airplane landing gear strut or the like, so that for the purpose of quick service, the separate unitary wheel and brake subassemblies may be readily removed from the stationary support as a unit, and a replacement unit remounted upon the strut or other stationary support very quickly and efficiently with a minimum of work.

Other objects and advantages of the invention will be hereinafter described or will become apparent to those skilled in the art, and the novel features thereof will be defined in the appended claims.

Like reference characters designate corresponding parts in the several figures of the drawings and in this specification, wherein, for the purpose of illustration, a support such as an airplane landing gear strut 1 (shown in broken lines in FIG. 3) is provided with an enlarged supporting flange 2 from which projects an axially extended stub shaft or axle 3 having a threaded free end. A wheel assembly 4, such as one of a type ordinarily used in association with landing gear of aircraft, is suitably mounted upon the axle 3 of the strut 1 as by means of a pair of roller bearing assemblies 5, 5 interposed between the hubs of said wheel and the axle 3. It is to be understood, however, that this invention is not limited to aircraft wheel brakes, inasmuch as it is equally well adaptable to other vehicle wheels and friction devices in general for effecting the transmission and absorption of torque.

The wheel assembly 4, as shown, is of a unitary form when assembled, and comprises two readily separable parts, an inboard and an outboard part 4a and 4b respectively. Forming a part of the wheel assembly 4 is a hub designated generally at 6 which comprises a composite inboard and outboard hub portion 6a and 6b, respectively, each of the latter being preferably integrally formed with the parts 4a and 4b respectively. Further included is a wheel or tire rim designated generally at 56 which comprises an inboard and an outboard rim portion 56a and 56b, respectively, each latter portion also being preferably integrally formed with said respective portions 4a and 4b, said parts 4a and 4b each being held in gasketed nested relationship as by a plurality of circumferentially spaced bolt, washer and nut assemblies 4c, best seen in FIG. 3. However, these details are not material to the invention.

Wheel assembly 4 is spaced a predetermined distance from the mounting flange 2 by means of a generally funnel-shaped or belled sleeve spacer 7 which positions the inboard bearing assembly 5 within the inboard hub portion 6a of wheel assembly 4. Spacer 7 comprises a small diameter sleeve portion 8 which slidably embraces the axle 3, and a sleeve portion 9 of larger diameter which abuts against the flange 2 and which serves another important purpose to be described hereinafter. A tapered intermediate section of the sleeve 7 integrally joins the two sleeve portions 8 and 9. A bearing seal assembly 10, which protects the bearings from entry of foreign material, is seated around the O.D. of the sleeve portion 8 of spacer 7 and within the I.D. of the inboard hub portion 6a of the wheel assembly 4. The seal assembly 10 is retained in position as by means of a conventional snap ring 10a. The wheel assembly 4 is retained upon the axle 3 as by means of a lock washer and threaded nut assembly 11 which cooperate with the threaded free end of the shaft or axle 3 in a conventional manner. A suitable hub cap 11a is preferably provided to seal off this latter end of the wheel and axle and may be retained in place as by means of a conventional snap ring 11b.

Another function performed by the sleeve spacer 7, and more particularly by its larger portion 9, is to centrally pilot or position the mounting of a relatively stationary brake assembly generally designated 12 concentrically about the stub axle 3. A suitable plurality of bolt and nut assemblies 13 serve to rigidly connect the brake assembly 12 to the flange of the strut support 1.

The brake assembly 12 includes a housing formed of a pair of generally flat radially extended annular co-axially spaced inboard and outboard end plates 14 and 15, respectively, which are rigidly interconnected preferably near their respective inner peripheries by means of an axially extended generally cylindrical hollow hub 16 which, in turn, is provide with a plurality of circumferentially spaced stator friction disc anchoring splines 17 on its outer periphery. At least one pair of threaded bolts 18 serve to initially secure inboard end plate 14 in sub-assembly with hub 16, while the bolt and nut assemblies 13 thereafter more permanently and more rigidly complete the assembly as the brake assembly 12 as a whole is mounted on the wheel strut flange 2. Other threaded bolts 19, which are circumferentially spaced and pass through and near the inner periphery of outboard end plate 15, are used to rigidly connect said plate 15 to the hub 16 after the other brake components, to be described hereinafter, have been assembled.

Figure 1:
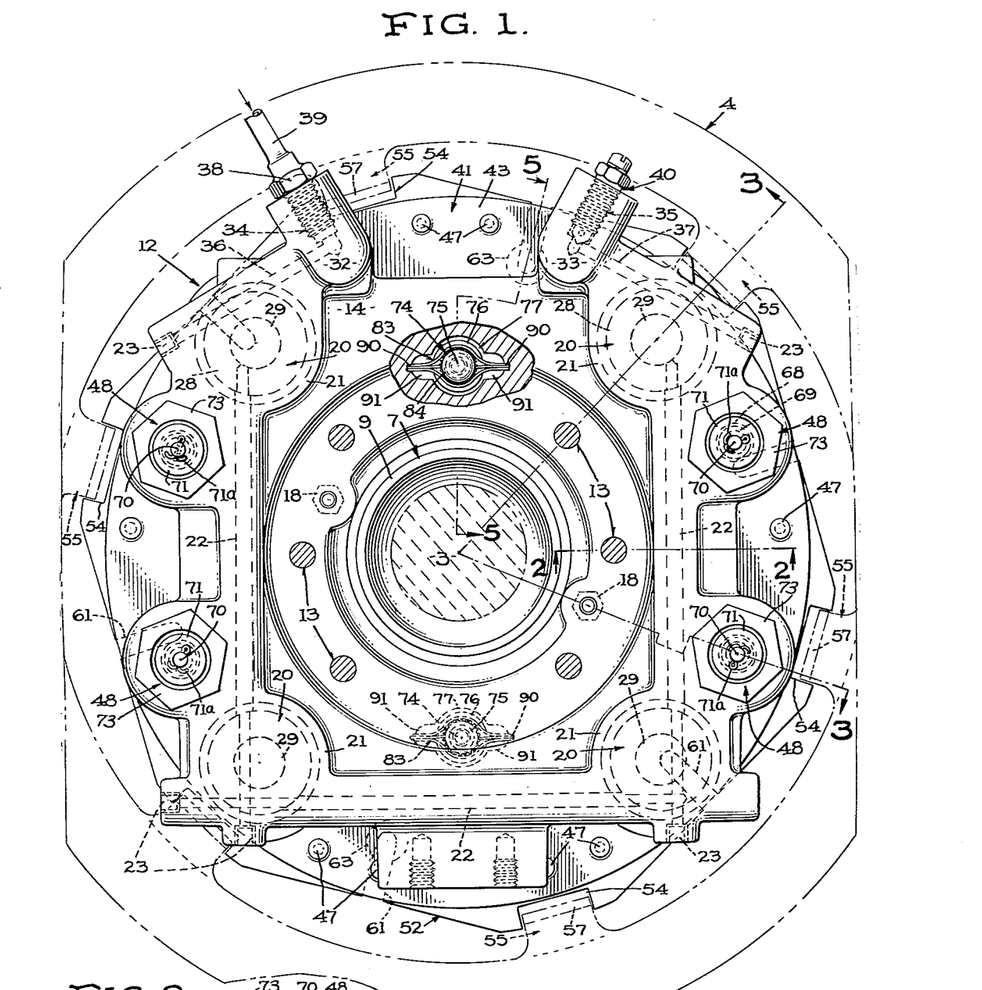
FIG. 1 is illustrative of an inboard elevation view of the assembled friction device of this invention, as seen substantially on line 1—1 of FIG. 3, showing the wheel and its rotor disc driving splines in broken lines, and with a portion of the housing broken away to more clearly show one of the automatic adjuster means thereof.
Figure 2:
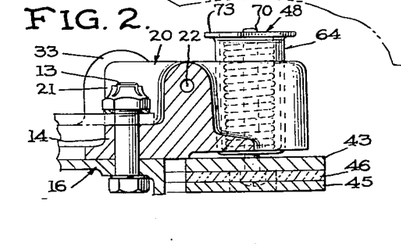
FIG. 2 is a fragmentary cross-sectional view more clearly showing the details of the housing structure and related components as taken substantially on line 2—2 of FIG. 1.
Figure 3:
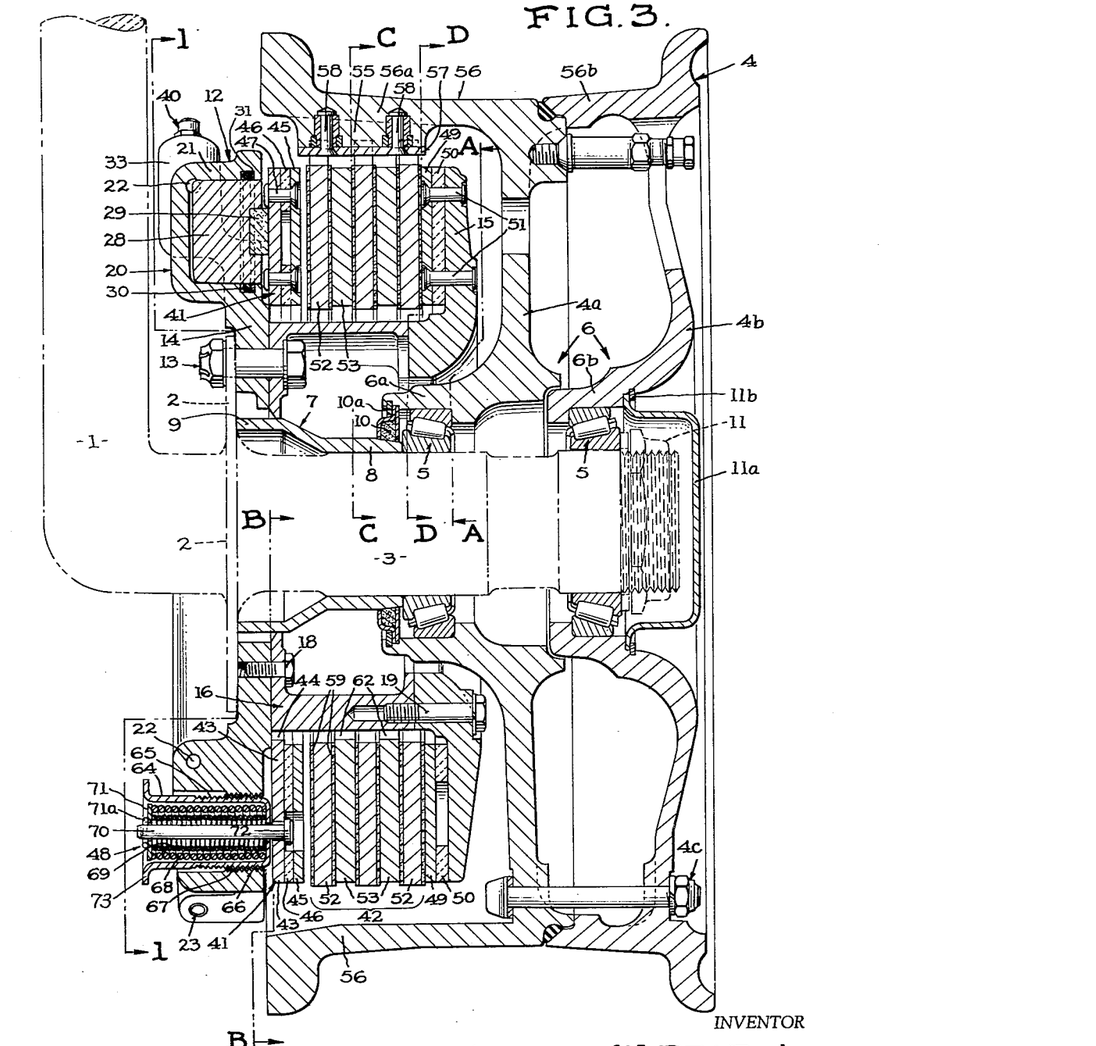
FIG. 3 is a view in cross-section of the wheel and brake assembly of this invention, as taken substantially on line 3—3 of FIGS. 1 and 4.
Figure 9:
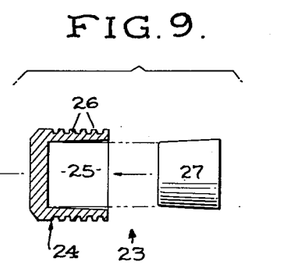
FIG. 9 is an exploded detail view, partly in cross-section and partly in elevation, of one of the pin-plug assemblies used to seal the open ends of the passageways interconnecting the fluid-pressure-operated actuator cylinders.

The inboard end plate 14, which serves as a so-called power plate, is fabricated preferably from a very durable and lightweight metal and is provided with a plurality of circumferentially spaced fluid-pressure-responsive operators, preferably in the form of hydraulic powered actuator motors 20 (better seen in FIGS. 1 and 3). The motors 20 comprise cylinders 21 which are interconnected by drilled or otherwise formed passageways 22, the open ends of which are sealed or plugged as by means of commercially available plug-pin assemblies 23. The latter, the details of which can be readily seen in FIG. 9, comprise a thimble element 24 having a slightly tapered inner wall defining an axial recess 25. The outer wall of the thimble element 24 is provided with a plurality of annular spaced sealing flanges 26 which cooperate with the wall of the passageway 22 to effect a seal therewith responsive to the insertion of a complementary tapered pin or plug 27 within the thimble recess 25 which serves to spread the thimble into fluid-tight engagement with the wall of the passageway.

Each actuator motor 20 further comprises a cylindrical piston 28 reciprocably disposed within the cylinder or chamber 21. Piston 28 is provided with an insulator pad 29 on its exposed face for operative engagement against an actuator disc assembly 41 to be described hereinafter. The operating hydraulic fluid medium is prevented from leaking from the cylinder 21 outwardly past the piston 28 by means of a conventional resilient O-ring seal 30 disposed in contiguous relation with an annular less-resilient back-up washer 31, this composite sealing combination being preferably recessed within an annular groove in the wall of cylinder 21 and of a diameter to afford close wiping contact with the outer periphery of the piston 28. Conversely, the same sealing means could be provided within an annular groove provided in the outer periphery of the piston 28. Washer 31 is preferably fabricated of a commercially available plastic "Teflon" material. Semi-resiliency, low heat conductivity and a low coefficient of friction are primary characteristics of "Teflon" which make it especially adaptable to this type of seal. The semi-resiliency of "Teflon" prevents the extrusion of the resilient O-ring seal 30 between the piston and its cylinder wall. The back-up washer 31 additionally serves as a dust wiper to preclude lining dust or other abrasive material from reaching the O-rings and entry into the interior of the motor 20.

The inboard or power plate 14 is further provided, preferably near its outer diameter adjacent to each of the two uppermost hydraulic motors 20, with a pair of bosses 32 and 33, each having a threaded aperture 34 and 35, respectively, as best seen in FIG. 1. Each of the threaded apertures 34 and 35 communicates with the respectively adjacent cylinders 21 of the hydraulic motors 20, as by means of drilled or otherwise formed passageways 36 and 37, respectively. Plug-pin assemblies 23 may also be used to plug the respective open ends of said passageways 36 and 37, similarly as in the case of the open ends of passageways 22. Threaded aperture 34 of boss 32 is provided with a fluid inlet fitting 38 which directs the operating pressure fluid from an attached conduit 39 into the hydraulic operator motors 20. A conventional threaded screw-type of bleed valve 40 is provided in the threaded aperture 35 of the other boss 33. It is to be understood that the said bosses may be used interchangeably if so desired.

Brake assembly 12 further comprises a plurality of relatively rotatable friction disc means which are disposed around hub 16 and between the inboard and outboard end plates 14 and 15, respectively. These friction disc means include an actuator disc assembly 41 and a friction disc pack generally designated at 42.

Figure 4:
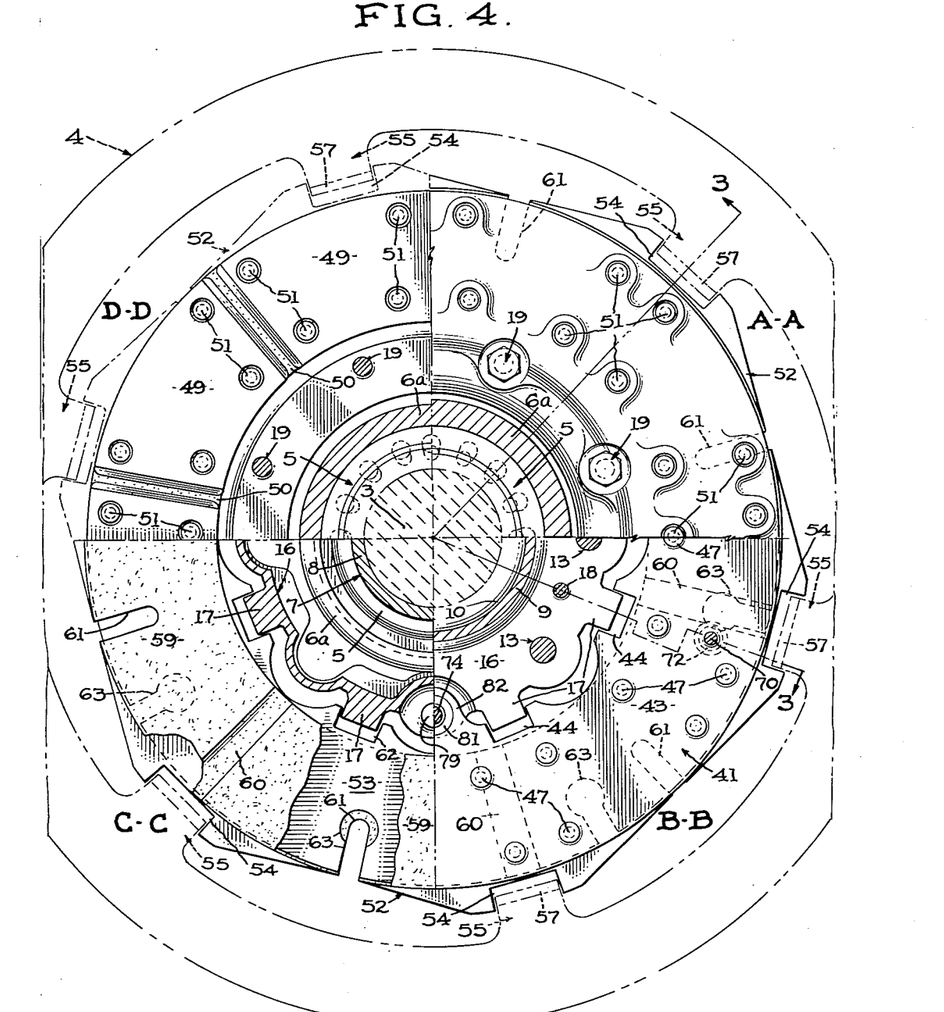
FIG. 4 is a composite sectional and elevational view of the brake assembly, showing 4 sectors or quadrants indicated respectively at A—A, B—B, C—C, and D—D, as viewed substantially on their correspondingly designated section lines of FIG. 3.
Figure 5:
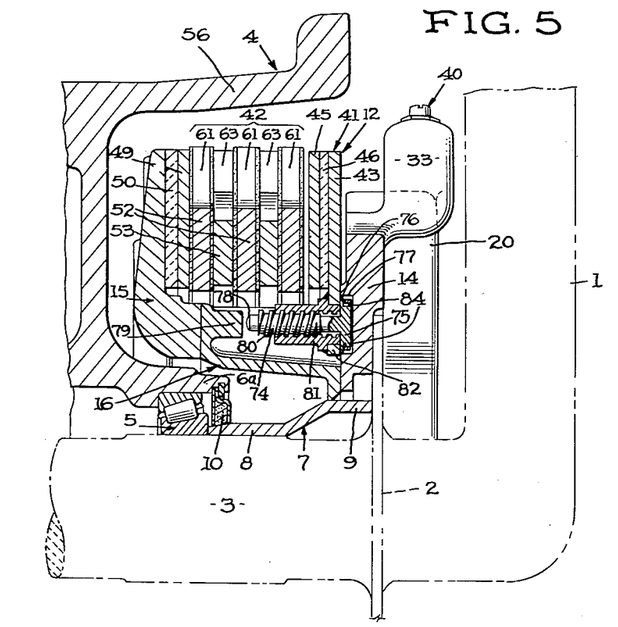
FIG. 5 is a fragmentary cross-sectional view through the brake assembly, as taken substantially on line 5—5 of FIG. 1, and showing more clearly the details of one of the automatic adjuster means and related brake components.

The actuator disc assembly 41 includes a flat annular primary actuator disc 43 having circumferentially spaced notches 44 about its inner periphery to provide for an axially slidable mounting only of the actuator disc 43 upon the splines 17 of the hub 16. One axial face of the actuator disc 43 is preferably provided with an annular band of metal material which comprises a plurality of circumferentially slightly spaced arcuate metal segments 45, similar to those on outboard end plate 15 yet to be described but illustrated in quadrant D—D of FIG. 4. The said segments 45 are preferably disposed upon a medially perforated annular insulator disc or ring 46, with both the ring 46 and the metal segments 45 being suitably secured to the actuator disc 43 as by a plurality of rivets 47. The metal segments 45 are disposed upon the actuator disc 43 so that they face and cooperate with preferably sintered lining material bonded upon opposite faces of an adjacently disposed rotor friction disc 52 of the disc pack 42. The other axial face of the actuator disc 43 is disposed for contiguous engagement with the insulator pads 29 of the hydraulic motors 20 when in assembled relationship.

Actuator disc assembly 41 is slidably piloted upon the splines 17 of hub 16 and is resiliently affixed to the inboard end plate 14 concentrically with the axis of the stub shaft 3 and hub 16 as by means of a plurality of adjustable return spring assemblies 48 which will be described in detail hereinafter.

Outboard end plate 15, sometimes referred to as a secondary disc or back-up plate, is provided on its inward face with an annular band of friction lining material comprising a plurality of circumferentially slightly spaced arcuate disc segments 49, similar to those provided on the actuator disc 43, said segments 49 being preferably disposed contiguously upon a medially perforated annular insulator ring 50. Both the insulator ring 50 and lining segments 49 are affixed to the back-up plate 15 in any suitable manner, as by rivets 51.

Disc pack 42 is disposed between the two end plates 14 and 15 and comprises a plurality of preferably alternately interleaved annular rotor and stator friction discs 52 and 53, respectively. Each rotor disc 52 is provided with a plurality of circumferentially spaced notches 54 about its outer periphery for both cooperative rotary driving engagement with, as well as for axially shiftable movements upon, the complementary driving splines or keys generally designated at 55 and provided upon the inner periphery of the wheel and tire rim 56, and more particularly upon the inner periphery of inboard rim portion 56a, of the wheel assembly 4.

The splines 55 include a key plate or wear shoe 57 detachably secured to each spline 55 as by means of screws or rivets 58.

Each rotor disc 52 is further provided on opposite sides with an annular band of sintered metallic lining material 59, preferably bonded thereto, as previously mentioned hereinabove. The said band 59 may be further provided with very shallow radially extended scavenging grooves 60, as best seen in quadrant C—C of FIG. 4. Moreover, each rotor disc 52 is provided on its outer periphery with a plurality of radially inwardly extended slots 61 located substantially midway between each of the pairs of driving spline notches 54, said slots 61 being cut completely through the thickness of the disc 52 and lining materials 59, and serving the dual function of acting both as wiping and stress relief slots.

The stator discs 53, like the primary actuator disc 43, are each provided on their inner periphery with a plurality of notches 62 which cooperate with the anchor splines 17 of hub 16 to permit axially shiftable movements only of said stator discs 53. A plurality of radially inwardly extending combined wiping and stress relief slots 63 are also provided at circumferentially spaced points around the outer periphery of discs 53, as are the similar dual purpose slots 61 in the rotor discs.

Accordingly, a substantial heavy duty disc pack 42 is provided, wherein any desired practical number of rotor and stator friction discs may be employed, said pack 42 and the actuator disc assembly 41 being disposed between the brake assembly housing end plates 14 and 15 for axial and relatively rotatable shifting movements.

The illustrated brake is shown in its released condition, with the rotor discs 52 free to rotate along with the wheel assembly 4. When it is desired to apply the brake to retard rotation of the rotor discs 52, and consequently to retard rotation of the wheel assembly 4, the pressure fluid operating medium is directed under pressure into the interconnected actuator motors 20 behind each of the pistons 28 to effect axial shifting of said pistons 28 against the actuator disc assembly 41, which is resiliently attached to the inboard housing plate 14 by means of the adjustable return spring assemblies 48. Responsive to the axial movement of pistons 28, the actuator disc assembly 41 is also shifted axially toward the secondary disc of back-up housing plate 15 and into interengagement with the friction disc pack 42 which is subsequently forced against said back-up plate 15. Because of the multiplicity of friction surfaces provided by the plurality of interleaved friction discs and by the metal segments carried both on the insulated back-up plate 15 and on the insulated primary actuator disc 43, heavy duty braking and torque absorption is efficiently effected, with attendant safe and quick deceleration of the vehicle or apparatus upon which the brake assembly is mounted.

When the brake is used for absorbing relatively high torque loads, substantial heat is generated by the frictional interengagement of the various discs, and therefore use of the insulating rings 46 ind 50 and the insulator pads 29 all help to prevent heat transmission to the operating pressure fluid in the cylinders 21, thus assuring operation of the brake under high temperature conditions which are created by the high degree of heat generated thereby. Moreover, the hub 16 of the brake housing assembly may be provided with a plurality of circumferentially spaced openings (not shown) through which air will be free to pass into, around, through and out of the hub and associated brake components to further aid in the cooling thereof.

When the brake operating pressure fluid is released, the adjustable return spring means 48 act to disengage the primary actuator disc and the other friction discs, thus returning the components to their non-applied positions.

Referring to FIG. 3, each return spring assembly 48 is adjustable to provide and compensate for varying amounts of release tension on the actuator disc assembly 41, which is desirable to afford an efficient manual adjustment means in the event this is preferred, to the automatic adjustment means provided. The said spring assemblies 48 each comprise an elongated cupped spring retainer or thimble 64 which is provided with exterior threads 65 for a substantial distance along the cylindrical body near the closed end thereof to provide for threaded mounting in the power plate 14. Complementally disposed threads 66 of a diameter slightly larger than the threads 65 are provided in the power plate 14, said threads 66 being of a size to receive a self-locking coiled screw thread insert 67 into which the spring retainer thimble 64 is threadedly and adjustably mounted. Within the spring retainers 64 there are mounted a pair of coaxial dual return springs 68 and 69 around a spring pin 70. The said springs 68 and 69 are disposed to seat against the inner closed end of retainer 64 and are held under tension and restrained at their opposite ends on the pin 70 as by a washer 71 and a cotter key 71a. Pin 70 passes through aligned apertures in the actuator disc assembly 41 and closed end of spring retainer 64, and is provided with an enlarged head 72 which seats within aligned recesses in the metal segments 45 and insulator ring 46 and up against the outboard face of the primary actuator disc 43 to hold it in position. Thus, these spring retainers serve to resiliently mount the actuator disc assembly on the power plate 14. The spring retainers 64 are adjustable by manual rotation of the same within the self-locking screw inserts 67. To better facilitate the rotation thereof, each retainer 64 is preferably provided at its open outer end with a radially extended tool-engaging flange 73, illustrated as a hexagonal head in the accompanying drawings (FIG. 1).

In accordance with further important features of this invention, the brake is provided with automatic adjuster means for maintaining a predetermined release clearance between the actuator disc assembly, the friction discs, the secondary disc or back-up plate, and the power plate as the friction lining surfaces wear down during use. Such automatic adjuster means are preferably provided at diametrically opposite positions and carried by the actuator disc assembly 41 and are mounted in a position extending axially of the brake for operation directly responsive to axial thrust, as distinguished from self-adjuster means mounted for response to rotative movement of the brake operating or actuator means such as encountered in some self-energizing types of brake, although by employing simple modifications to certain of the brake elements, some of which are suggested in the following, the self-adjuster means to be described in detail in the following would be equally well adaptable to self-energizing or servo types of brakes.

Figure 8:
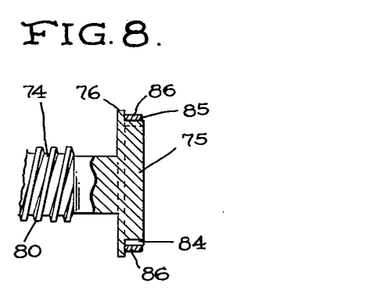
FIG. 8 is a fragmentary enlarged view, partly in elevation and partly in cross-section, showing the details of one of the adjuster screw heads.

Referring to FIGS. 1, 5, 6 and 7, one form of self-adjuster means will now be described in detail. Each of the automatic adjuster means comprises a one-way shiftable member preferably in the form of a screw-threaded member 74 having a circumferentially serrated head 75 with a radially outwardly extended flange 76 formed on the side of the head toward the lead end of the screw (better seen in FIG. 8). The head 75 is disposed adjacent to the inboard end plate 14, and preferably within a recess 77 provided in said inboard plate 14 (better seen in FIGS. 1 and 5). The other end of the screw 74 is rounded as at 78 and is disposed closely adjacent to an axially projecting bearing pad or boss 79 on the connecting hub 16 which rigidly interconnects the end plates 14 and 15. Screw 74 is provided with buttress type of threads 80 preferably having a relatively high lead angle to assure reasonably easy rotation thereof responsive to the application of end thrust imparted thereto when the rounded lead end 78 abuts against the pad or boss 79 after sufficient lining wear has occurred to permit this. The screw 74 is rotatably supported within an axially projecting lug 81 affixed to a radially inwardly projecting portion 82 of the primary actuator disc 43, with the headed and lead ends of the screw projecting in opposite directions from the lug 81 toward the respective end plates 14 and 15. More specifically, lug 81 as illustrated in the drawings, is in the form of a separate generally cylindrical member inserted within and affixed to said portion 82 as by brazing or welding so as to become unitary with primary actuator disc 43. If desired, lug 81 may be formed integrally with the disc 43. The overall length of the adjuster screw 74 is slightly less than the distance between the aforementioned opposed bearing pad or boss 79 and the radial base wall of the recess 77 within which the screw head 75 nests. The remaining gap or space is representative of a predetermined release clearance for the brake components, so that when the brake is in the non-applied or released condition, the actuator disc assembly 41 and the interleaved motor and friction discs will be free for relative rotation without frictional drag therebetween.

As progressive wear of the friction surfaces occurs, the actuator disc 43 necessarily must travel progressively farther toward the back-up or secondary plate 15 to complete effective engagement of the brake, whereupon the lead end 78 of the adjuster screw 74 of each adjuster means engages against the adjacently disposed boss or bearing pad 79 and an endwise pressure is applied to the respective screws to effect axial rotation thereof, causing the headed end 75 of each screw 74 to project farther from within its supporting lug 81. Accordingly, the release movement of travel of the actuator disc assembly 41 is limited by abutment of the respective screw heads 75 against the end wall of recess 77.

Figures 6, 7:
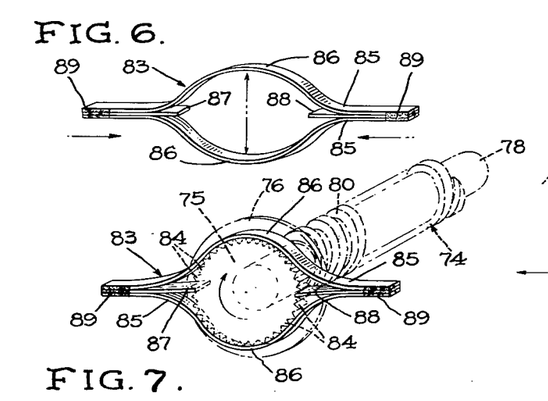
FIG. 6 is a perspective detail view of a novel detent bow spring assembly which is used in conjunction with the automatic adjuster screw means, as seen in its unflexed and unapplied condiiton.
FIG. 7 is a perspective detail view of the bow spring detent of FIG. 6 in its compressive flexed condition as applied to the serrated head of the adjuster screw which is shown in broken lines.

In order to provide positive means for precluding overrunning of the screw or other inadvertent adjusting rotation such as may be caused by road vibrations, as well as to preclude any reverse rotation of the screw 74 during release movements of the actuator disc 43, novel spring detent means in the form of a double bow spring detent assembly 83 are utilized. The detent assembly 83, which provides circumferential pressure on the head of the screw, is adapted to engage with the circumferentially disposed serrations or teeth 84 on the screw head 75. Each bow spring detent assembly 83, the details of which are better seen in FIGS. 1, 6 and 7, preferably comprises a pair of thin resilient metal leaf springs 85, 85 having arcuate centrally bowed portions 86, 86 disposed in opposed relation to each other so that in their initial unflexed condition they form a generally elliptical or oval configuration with pointed ends defined by the juncture of the ends of the respective leaf springs which come together to form extended wings lying substantially in the same plane. Interposed between each pair of the adjacently disposed ends of the leaf springs 85, 85, is one end of the respective substantially shorter flat detent leaf springs 87 and 88 which are formed of similar thin resilient material as are the springs 85, 85. The outer opposed ends or wings of these interleaved bow and flat springs are preferably secured together as by brazing, soldering or the like, as designated at 89, with the other free ends of the shorter leaf detent springs 87 and 88 projecting inwardly toward each other in the same plane and in opposed spaced relation to each other, as clearly illustrated in FIG. 6. FIG. 6 shows the spring detent assembly in its unflexed or relaxed condition prior to being mounted upon the serrated screw head 75, while in FIG. 7, the spring assembly 83 is shown after the outer ends or wings have been compressed toward each other in order to spread the bowed portions 86, 86 farther apart into a more nearly round configuration to facilitate mounting it over and around the serrated head 75 to seat against the radially extended head flange 76 which serves to retain it against axial displacement from the head 75 during operative adjusting movements of the screw. When the detent assembly 83 is applied to the screw head 75, the free ends of the detent springs 87 and 88, which normally tend to assume a co-planar opposed position with respect to each other wherein the space between said ends is slightly less than the root diameter of the screw head teeth 84, become forced offset or canted from each other and their co-planar positions during said mounting, enabling the seating of said detent springs between said teeth 84. When used in association with an adjuster screw having left-hand screw threads, as illustrated in FIG. 7, with the screw rotating in a clockwise direction during adjustment, it becomes apparent that one of the spring detents 87 is canted slightly upward while the other spring detent 88 is canted slightly downward with respect to their original co-planar positions. The reverse would be true for a screw provided with right-hand threads and adapted to rotate in a counter-clockwise direction.

The spring detent assembly 83 is prevented from rotating along with the adjuster screw 74, during adjustment, because the joined wings or ends 89 are confined within seats 90, 90 of diametrically opposed lateral recesses 91, 91 extending from the main recess 77 provided in the power plate 14, and best seen in FIG. 1. Accordingly, one-way adjustment rotation of the screw 74 is provided while normally precluding retrograde or reverse rotation thereof due to the novel spring detent means which precludes a reverse rotation of the screw.

Inasmuch as the actuator disc return spring assemblies 48 are of an improved adjustable form, the advantage thereof becomes apparent in that the amount of return spring tension exerted by the coaxial springs 68 and 69 can be manually varied, thus providing an alternate manual means of adjustment in the event this is preferred to automatic adjustment. This would permit removal of the entire automatic adjustment mechanism, if desired. This adjustable provision thereby affords a uniform self-adjustment and release clearance of the friction discs and related brake components throughout the life of the brake.

Figures 10, 11, 12, 13:
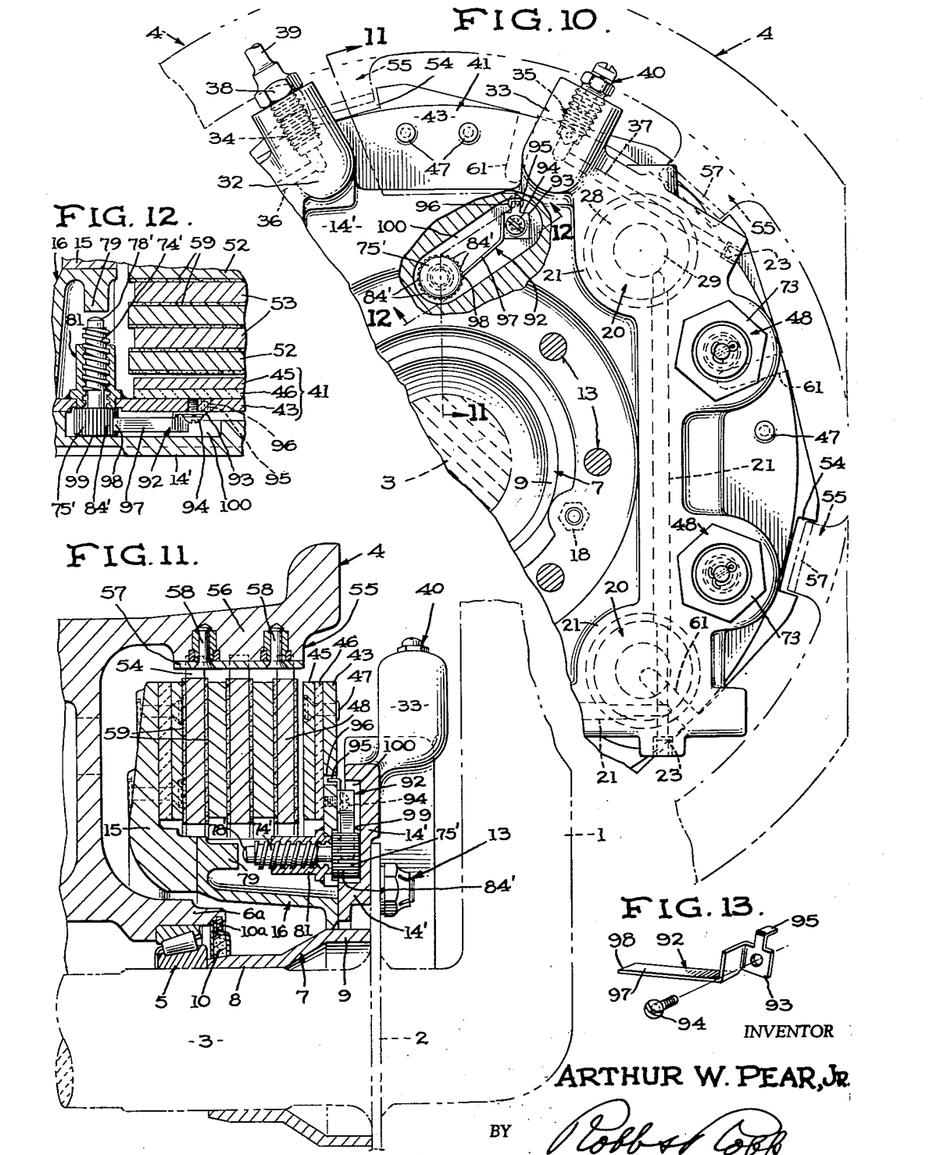
FIG. 10 is a fragmentary inboard elevational view of a brake assembly similar to FIG. 1, with a portion of the housing broken away to more particularly illustrate a modified embodiment of automatic adjuster screw detent spring means.
FIG. 11 is a fragmentary cross-sectional view through the brake assembly and modified adjuster screw spring detent means, as taken substantially on line 11—11 of FIG. 10.
FIG. 12 is a further fragmentary cross-sectional detail view, as taken substantially on line 12—12 of FIG. 10.
FIG. 13 is an exploded perspective detail view of the detent spring and mounting screw used in conjunction with the modified automatic adjuster means of FIGS. 10, 11 and 12.

Referring now to a modified embodiment of automatic adjuster screw spring detent means, FIGS. 10–12 inclusive are illustrative of its adaptation to the same previously described form of disc brake and automatic adjuster means. Because the brake components of this embodiment are substantially identical in form and arrangement as previously described, there is no need to repeat the description and operation thereof, and those components wherein a change has been made are designated by correspondingly primed reference numerals, while additional and new parts have been given new reference numerals.

Referring first to FIG. 10, the power plate 14' is partially broken away to more clearly show the modified spring detent means which comprises an angularly bent leaf spring detent designated generally at 92. This detent 92 is preferably in a form which comprises a supporting base flange 93 which is fixedly mounted upon the actuator disc 43 (see FIGS. 11 and 12) as by means of a screw 94 or similar fastener, said base flange 93 being provided with a small anchor finger 95 which extends axially therefrom into a small hole 96 in said disc 43 to preclude rotative displacement of the detent 92. An outwardly projecting portion extends at substantially right angles from the base flange 93 and has a resilient leaf spring type of detent arm 97 with a free end 98 projecting angularly therefrom toward the head 75' of the adjuster screw 74'. This free end 98 is adapted to engage in the teeth 84' on the head 75' of the screw 74'.

Reviewing the self-adjusting action of the brake, it will be apparent that as the friction lining surfaces of the various discs and plates begin and continue to wear, the actuator disc assembly 41 must shift progressively farther toward the fixed back-up end plate or secondary disc 15 in order to effectively engage the brake. In doing so, the lead end 78' of the adjuster screw 74' of each of the adjusters engages or abuts against the adjacently disposed bearing pad 79 on hub 16, with attendant endwise pressure being imparted to the respective adjuster screws 74' to effect axial rotation thereof, whereby the headed end of each adjuster screw 74' will project farther from the screw supporting lugs 81. Therefore, return or release movement of actuator disc assembly 41 will be limited as the screw heads 75' abut or bear against the end bearing wall surface 99 of recess 100 which is provided in the inner face of power plate 14' to house this modified automatic adjuster means. It is readily apparent that the spring detent 92 positively precludes rotation of the respective adjuster screws in a reverse direction so that the endwise pressure imparted to the ends of the screw heads as they abut against wall surface 99 during release travel, will not cause any axial travel of the said screws. Moreover, the leaf spring detent arm 97 exerts a lateral pressure to the screws 74' to preclude any inadvertent or undesirable rotation of the screws 74' when the brake is released as might be caused by road travel vibrations etc., as well as preventing any overrunning of the screw during brake adjustments.

It should be readily apparent that the automatic adjuster means described in the foregoing are equally operative irrespective of the direction of rotation or travel of the vehicle wheel upon which it is mounted. Furthermore, they are equally adaptable to brakes of the self-energizing type wherein the actuator disc assembly is disposed for both axial and slightly rotative movements, the latter being responsive to drag torque imparted thereto by the adjacent rotor friction disc as the friction disc means become frictionally interengaged during braking. Accordingly, the self-adjuster screw means carried by the slightly rotatable actuator disc assembly would require the use of slightly circumferentially extended bearing pads and surfaces to provide a uniform circumferential surface for engagement thereagainst by the respective lead ends and head ends of the adjuster screws.

In view of the foregoing, it is apparent that an improved brake of the class described is provided having novel automatic adjuster means operable in conjunction with improved adjustable actuator return or release spring means. Furthermore, an improved and practical combined wheel and brake assembly is provided wherein the improved brake instrumentalities form one unitary sub-assembly 12 and the separable 2-part wheel assembly 4 forms another unitary sub-assembly. It is merely necessary to disconnect the source of brake operating pressure fluid at the fitting 38, and unfasten the mounting bolt and nut assemblies 13 and the nut 11 which holds the wheel on the axle 3, whereupon the entire wheel and brake assembly can be readily removed from the strut 1, and a corresponding new or rebuilt brake sub-assembly and/or wheel sub-assembly may be quickly remounted upon the strut and axle, thus affording very quick service of aircraft or other vehicles and/or machinery equipped with the brake assembly of this invention.

While the specific details of this invention have been herein shown and described, it is not confined thereto since changes and alterations may be made without departing from the spirit and scope thereof as defined in the appended claims.

I claim:

1. In a friction device of the class described which includes a pair of relatively fixed coaxially spaced end plates between which are disposed a plurality of relatively rotatable and axially shiftable friction discs, actuator means provided on one of said end plates for shifting said discs axially in one direction to effect frictional interengagement thereof with each other and the other end plate, means for effecting a release clearance of the discs of the friction device when the latter is in a released condition, and automatic wear-adjuster means for limiting movement of said discs in the opposite direction, said adjuster means including a one-way shiftable member in the form of a screw rotatably carried by and projecting axially in opposite directions from one of said discs for operative engagement at its opposite ends with said end plates, said screw having a plurality of circumferentially spaced peripheral teeth, and detent means cooperable with said teeth for preventing rotation of said screw in one direction, that improvement wherein the detent means includes a resilient bow spring assembly circumferentially embracing said teeth in frictional engagement therewith for a substantial distance around said teeth, at least one spring detent carried by said bow spring assembly and disposed to resiliently and selectively engage between any adjacent pair of said teeth, and means for precluding relative rotation of said bow spring assembly.

2. A friction device as defined in claim 1, wherein the bow spring assembly is provided with a pair of substantially diametrically opposed detent springs disposed to engage between opposed pairs of the teeth.

3. In a friction device of the class described, comprising a pair of relatively fixed end plates, said end plates constituting a power plate and a back-up plate respectively and being rigidly interconnected by a hollow hub disposed axially therebetween, said hub and power plate each having circumferentially spaced and axially opposed abutment surfaces provided thereon, a plurality of relatively rotatable and axially shiftable friction discs disposed between said end plates, an axially shiftable actuator disc disposed between said power plate and the friction discs, actuator means provided in said power plate for axially shifting the discs in one direction to effect frictional interengagement with each other and with the back-up plate, means for effecting a release clearance between the discs and the back-up plate when the friction device is in a released condition, and a pair of circumferentially spaced and axially disposed automatic one-way shiftable wear take-up members cooperatively carried by the actuator disc for limiting movement of the latter in a releasing direction, each of said one-way shiftable members being in the form of a screw having its ends projecting in opposite directions toward said end plates for cooperative alternate engagement with said abutment surfaces, the length of said screw being slightly less than the distance between said abutment surfaces when the friction device is disengaged, and spring detent means for preventing rotation of the adjuster screws in one direction, said screws having a plurality of circumferentially spaced teeth thereon engageable with said detent means, that improvement wherein the detent means includes a resilient bow spring assembly at least partially circumferentially embracing said teeth in frictional engagement therewith and having at least one spring detent disposed resiliently and selectively to engage between any adjacent pair of said teeth, and means for precluding relative rotation of said bow spring assembly.

4. In a friction device of the class described, which includes a pair of relatively fixed coaxially spaced end plates between which are disposed a plurality of relatively rotatable and axially shiftable friction discs, actuator means provided on one of said end plates for shifting said discs axially in one direction to effect frictional interengagement thereof with each other and the other end plate, automatic adjuster means for limiting movement of said discs in the opposite direction, said adjuster means including a one-way shiftable member in the form of a screw rotatably carried by and projecting axially in opposite directions from one of said discs for operative engagement at its opposite ends with said end plates, and detent means for preventing rotation of said screw in one direction, that improvement wherein the adjuster screw means comprises a screw provided with a plurality of circumferentially closely spaced teeth near one end thereof, said screw having a flange projecting radially therefrom adjacent to said teeth and said screw end, and said detent means including a bow spring assembly circumferentially engaging and resiliently straddling said teeth contiguous to said flange to prevent axial displacement of the spring assembly from the teeth during operation, and said spring assembly having at least one spring detent resiliently engageable between selective pairs of teeth.

5. A friction device as defined in claim 4, wherein the end plates are rigidly interconnected to form a brake housing, and wherein the bow spring assembly and said housing are provided with cooperative means for preventing rotation of said bow spring assembly during rotatixe axial adjusting movement of said screw.

6. A friction device as defined in claim 4, wherein the bow spring assembly and one of said end plates are provided with cooperative means for preventing rotation of said spring assembly during rotative axial adjusting movement of said adjusted screw.

7. A friction device as defined in claim 5, wherein said last-mentioned means includes at least one laterally extended wing on said bow spring assembly cooperatively interengaged with said housing.

8. A unitary bow spring detent assembly for cooperative peripheral engagement with a plurality of circumferentially spaced adjuster teeth provided upon a one-way shiftable adjusting member, said bow spring assembly comprising a pair of resilient oppositely bowed strap members having their corresponding terminal ends joined together, and a pair of substantially shorter opposed and substantially aligned resilient detent members each having a free end directed toward the other in a manner that substantially longitudinally bisects the bowed configuration, the bowed strap members and the shorter detent members having their outermost ends terminating in opposed laterally extended unitary wings, and the detent members being of such a length that their opposed free ends assume a predetermined spaced distance which is equal to slightly less than the root diameter of the aforesaid teeth in order to effect a circumferential compressive gripping of and a positive one-way mechanical interlock with the one-way shiftable member when the detent spring assembly is mounted upon the adjuster member.

9. A unitary bow spring detent assembly for cooperative peripheral engagement with a plurality of circumferentially spaced adjuster teeth provided upon a one-way shiftable adjusting member, said bow spring assembly comprising a pair of resilient oppositely bowed and substantially oppositely aligned arcuate leaf springs, said leaf springs each having oppositely extended wings adjacently disposed and cooperatively affixed to each other, a pair of shorter resilient detent leaf springs each having one end fixedly interposed between said adjacently disposed ends of the bowed leaf springs, the free ends of the shorter leaf springs projecting toward each other but terminating at a substantially aligned predetermined spaced distance which is equal to slightly less than the root diameter of said teeth in order to effect a circumferential compressive gripping of and a positive one-way mechanical interlock with the one-way shiftable member when the detent spring assembly is mounted upon said adjuster member.

10. In a friction device of the class described, which includes a pair of relatively fixed coaxially spaced end plates between which are disposed a plurality of relatively rotatable and axially shiftable friction discs, said end plates being rigidly interconnected to form a brake housing, actuator means provided on one of said end plates for shifting said discs axially in one direction to effect frictional interengagement thereof with each other and with the other end plate, automatic adjuster means for limiting movement of said discs in the opposite direction, said adjuster means including a one-way shiftable member in the form of a screw rotatably carried by and projecting axially in opposite directions from one of said discs for operative engagement at its opposite ends with said end plates, and detent means for preventing rotation of said screw in one direction, that improvement wherein the automatic adjuster means comprises a screw provided with a plurality of circumferentially closely spaced teeth near one end thereof, said screw having a flange projecting radially therefrom adjacent to said teeth and said screw end, and said detent means including a bow spring assembly circumferentially engaging and resiliently straddling said teeth contiguous to said flange to prevent axial displacement of the spring assembly from engagement with the teeth aforesaid, said spring assembly having at least one spring detent resiliently engageable between selective pairs of teeth, said spring assembly and said housing being provided with cooperative means for preventing rotation of said spring assembly during rotative axial adjusting movements of said screw, and said last-mentioned means including a pair of substantially diametrically opposed laterally extended wings on said spring assembly interengaged with complementary recesses formed in the housing in which said wings are seated.

References Cited in the file of this patent

UNITED STATES PATENTS

| | | |
|---|---|---|
| 1,852,174 | Lyman et al. | Apr. 5, 1932 |
| 1,854,358 | Wilson | Apr. 19, 1932 |
| 2,165,978 | Miller | July 11, 1939 |
| 2,262,709 | Lambert | Nov. 11, 1941 |
| 2,770,333 | Smith | Nov. 13, 1956 |
| 2,778,452 | Dasse | Jan. 22, 1957 |
| 2,782,881 | Roller | Feb. 26, 1957 |
| 2,844,219 | Collier | July 22, 1958 |
| 2,875,855 | Albright | Mar. 3, 1959 |